Patented June 24, 1947

2,422,680

UNITED STATES PATENT OFFICE 2,422,680

PROCESS FOR PREPARING HYDROPHILIC COLOR-FORMER SILVER HALIDE DISPERSIONS

Andrew B. Jennings, New Brunswick, N. J., assignor to E. I. du Pont de Nemours & Company, Wilmington, Del., a corporation of Delaware No Drawing. Application June 1, 1944, Serial No. 538,336

7 Claims. (Cl. 95—7)

This invention is concerned with an improvement in the art of color photography. More particularly it relates to the preparation of hydrophilic color-former silver salt dispersions and to layers composed thereof. Still more particularly it relates to the chemical linking of color formers to hydrophilic hydroxyl polymers in the presence of light-sensitive silver halides and to the preparation of photographic elements therefrom.

Many of the modern methods of forming colored images in photographic elements such as films, plates and papers involve color coupling development, wherein color formers couple with the oxidation products generated during the development of silver salt latent images with primary aromatic amino developing agents and form dyes. Many types of color formers have been proposed for such methods. Some are not fast to diffusion in the colloid layers, others have a deleterious effect on the sensitivity of the silver halide emulsion and others are not compatible with the gelatin binding agents.

This invention has as an object the provision of new and useful color-yielding photographic elements which are free from the above disadvantages. Another object is to provide new color yielding elements which contain color formers that do not migrate during photographic processing. Another object is to permanently bind color formers to the hydrophilic binding agents of photographic silver halide dispersions. A further object is to provide color yielding colloid-silver halide dispersions in a simple and economical manner. Still other objects will be apparent to those skilled in the art from the following description of the invention.

The above objects are attained and new and useful photographic compositions and elements made by incorporating light-sensitive silver salts in solutions of hydrophilic film-forming hydroxyl polymers and reacting a bifunctional condensation agent and a color former or dye intermediate therewith. The condensation with the two components, namely, the hydroxyl polymer and the dye intermediate may take place simultaneously or stepwise. Thus, the hydroxyl polymer binding agent of the silver salt dispersion can be reacted with the bifunctional agent such as formaldehyde or a formaldehyde yielding substance; e. g., paraformaldehyde, acetaldehyde, benzaldehyde, glyoxal, trioxane, hexamethylenetetramine, etc.; or other functionally similar substance such as dimethylol urea and its mono- and dimethyl and -ethyl ethers; terephthalaldehyde, etc.; in the presence of the dye intermediate whereby a simultaneous condensation occurs, or the bifunctional agent may be reacted with the hydroxyl polymer in the presence of the dispersed silver salts and the dye intermediate then added. In general, it is advisable to have a condensation agent or catalyst present which is known to promote esterification or saponification reactions especially an inorganic or organic acid. The condensation products being formed in the presence of the silver salts become intimately associated therewith and result in dye images of increased density and saturation with the attendant advantages.

The hydrophilic, film-forming hydroxyl polymers used in the initial silver salt dispersions or emulsions contain a plurality of non-phenolic hydroxyl groups as the predominant hydrophilic component. They should, in general, contain at least one hydroxyl group for every eight carbon atoms of the polymer chain, i. e., about 12.5 hydroxyl groups for every 100 chain atoms and preferably one to two hydroxyl groups for every 4 chain atoms, i. e., between 25 and 50 hydroxyl groups per each 100 chain atoms. Among the classes of hydrophilic hydroxyl polymers which can be used, there may be mentioned hydrophilic cellulose ethers and esters, vinyl alcohol polymers and derivatives thereof including interpolymers, alginic acid derivatives, etc.

The dye intermediates or color formers which are to be joined to the hydrophilic hydroxyl polymers are preferably used in a relatively small amount in relation to the number of reactive groups in the polymers. Amounts which do not adversely affect the hydrophilic character of the resulting compounds may be tolerated. Thus, a hydroxyl polymer which is quite water sensitive and not entirely satisfactory as a photographic layer can be improved by the linking of color former or dye intermediate groups, in the above manner, in an amount sufficient to reduce the water sensitivity, so that the resulting polymer, while freely water permeable does not tend to dissolve in aqueous processing solutions at moderate temperatures. In general, for every 100 chain atoms, between 1 and 35 dye intermediate nuclei should be present and the polymer chain have more than 100 carbon atoms.

After condensation, the compositions consist of a hydrophilic color-forming polymer having a plurality of free non-phenolic (aliphatic) hydroxyl groups containing light sensitive silver salts uniformly dispersed therethrough. The resulting polymers consist of a single organic compound with two components that are chemically linked together, one being the residue of the hydroxyl polymer and the other being a dyestuff or color-former radical or nucleus. The latter radical or nucleus is present a plurality of times in the molecule however.

The invention can be applied with any dye intermediate or color former which will condense with the bifunctional agent, e. g., formaldehyde to form a bis- or polymeric compound without destroying the dye coupling structure. For instance, any of the simple color formers which are capable of coupling with the oxidation products of primary aromatic amino developing agents that are formed upon the color coupling development of silver salt images and form azomethine or quinone-imine (including indamine, indoaniline and indophenol) dyes, can be advantageously used.

Color formers or dye intermediates of the type just described are well known and legion. They have as the active coupling groups a structure which may be represented as

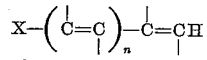

wherein X is HO— or RHN— wherein R is an alkyl or substituted alkyl radical, e. g., methyl, ethyl, dodecyl, B-chloroethyl, benzyl, etc., or a hydrogen atom, and $n$ is 0 or 1. This structure is found in the reactive methylene dye intermediates or color formers and in aromatic hydroxyl and amino compounds and includes reactive ethenol, amino-ethenyl, and 4-hydroxy- and 4-amino-butadienyl-1,4 groups. These groups occur in phenols, naphthols, anilines, naphthylamines, acylacetamides, cyanoacetamides, beta-keto esters, pyrazolones, N-homophthalylamines, coumaranones, indoxyls, thio-indoxyls, etc.

The reactive aminoethenyl group,

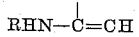

wherein R has the above significance, occurs in aromatic amino compounds which couple in the ortho position.

The 4-hydroxy- and 4-amino-1,3-butadienyl groups represented as

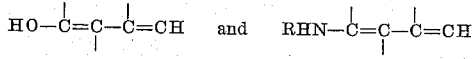

where R has the above significance, occur in phenolic, naphtholic and aromatic amino compounds which couple in the para (4) position.

In all of these dye intermediate groups the hydrogen atom in the coupling reactive position may be replaced by groups readily eliminated in the coupling reaction, e. g., halogen, sulfonic acid, carboxylic acid, etc.

The invention may be advantageously carried out with simple color formers of low molecular weight. Compounds of the latter type which tend to diffuse in gelatin or other colloid layers can thus be made immobile in accordance with this invention by chemically linking them with the hydroxyl polymers. This means that compounds which are rather simple in structure and capable of synthesis by non-complex methods can be utilized.

After condensation of the dye intermediate with the hydrophilic hydroxyl polymer binding agent of the silver salt dispersion has been completed, the composition can be modified for coating by the addition of solvents, if necessary, to obtain a proper viscosity. The resulting hydrophilic hydroxyl polymeric dye intermediate-silver salt dispersions are then coated onto a support such as a film base composed of a cellulose derivative, synthetic resin, e. g., polyvinylacetal, or superpolymer, e. g., nylon, or a paper, metal, plastic or glass support or unto a colloid or other layer of a photographic element. In the case of multi-layer films the novel dispersions of this invention can be coated onto a layer from a similar dispersion, e. g., one capable of yielding a different colored dye upon color coupling development. Sensitizing dyes, emulsion sensitizers, anti-fogging agents, etc., may be added to the dispersion before coating. Such materials can be incorporated with the layers after coating by bathing or impregnating the layer with a solution of a sensitizing dye, e. g., an aqueous acetone or alcohol solution.

The invention will be further illustrated by, but is not intended to be limited by the following examples wherein all operations were carried out under conditions which would not expose the light-sensitive salts.

*Example I*

A light-sensitive silver halide colloid-dispersion was prepared in a partially hydrolyzed hydrophilic ethylene/vinyl acetate interpolymer of mol ratio of about 0.1 of etheylene to 1 of vinyl acetate prepared by interpolymerizing ethylene and vinyl acetate as described in Example V of application Serial No. 446,116 filed June 6, 1942, followed by alkali catalyzed methanolysis as described in Example XI of application Serial No. 446,114, filed June 6, 1942, in place of the alcohol. The product has the group —$CH_2$—CHOH— representing at least 50% of the polymer chain, i. e., for every 100 chain atoms there are at least 25 hydroxyl groups.

Solution A:                                          Cubic centimeters
   10% solution of the above interpolymer
     in 20% aqueous alcohol_____ 250
   Water _____ 125
   Sodium dodecyl sulfate (5% aqueous)_ 10
   Potassium bromide (20%)_____ 60

Solution B:
   Silver nitrate (3N)_____ 37.5
   Ammonium hydroxide (20%)_____ 25
   Water_____ 50

Solution C:
   Resorcinol_____ 12.5
   Water_____ 12.5

Solution B at 95° F. was added with stirring to Solution A which was held at 125° F. Solution C was then added and the entire mixture was heated to 125° F. and held for ten minutes. After chilling and solidifying, the gel was shredded and washed for thirty minutes in running water. A 200 gram portion of the shredded particles was melted and treated at 110° F. with a solution of 0.1 gram of terephthaladehyde in 10 cc. of alcohol followed by a solution of one gram of m-aminophenyl-methyl-pyrazolone, whereby a condensation product was formed containing units of the probable formula:

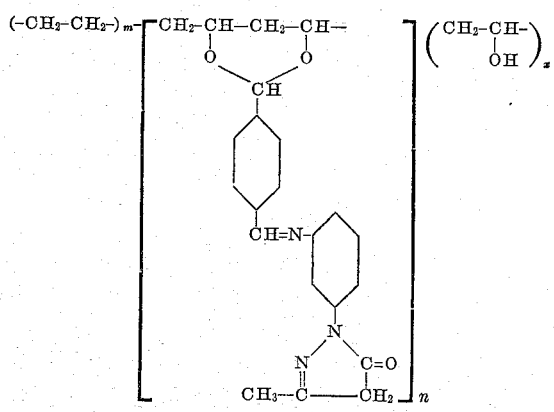

wherein $n$ is about 200, $m$ is about 45 to 50 and $x$ is about 50. The mixture was cooled to 100° F. and coated on a paper support. The resulting photographic element may be exposed through a negative or to an original subject and processed in a developer such as the following.

| | Grams |
|---|---|
| p-Aminodiethylaniline hydrochloride | 2 |
| Sodium carbonate anhydrous | 20 |
| Potassium bromide | 5 |
| Sodium sulfite | 1 | whereupon a magenta dye image formed in situ with the silver image. The silver and silver salts were removed after washing by treatment with 4% potassium ferricyanide and fixing whereby a magenta dye image of good color and excellent definition and density remained.

*Example II*

A photographic element identical with that in Example I was exposed to an object and processed to a reverse image in color by the following procedure:

It was developed for five minutes with intermittent agitation in the following first developer:

| | | |
|---|---|---|
| N-methyl-p-aminophenol sulfate | grams | 5 |
| Hydroquinine | do | 7.5 |
| Sodium sulfite | do | 60.0 |
| Potassium bromide | do | 4.5 |
| Water to make | liters | 1 |

After washing in the dark for ten minutes, the film is re-exposed to light and developed for ten minutes in the following solution:

| | | |
|---|---|---|
| p-Aminodiethylaniline hydrochloride | grams | 2 |
| Sodium carbonate anhydrous | do | 20 |
| Sodium sulfite | do | 0.5 |
| Water to make | liters | 1 |

After washing for 15 minutes in running water, the film is bleached in neutral or alkaline potassium ferricyanide, rinsed, fixed in plain hypo, washed and dried, whereby a reversed image of good strength and color purity is obtained. The magenta image, as obtained by reversal shows no loss in color strength as a result of the prolonged soaking in water and in the aqueous alkaline processing solutions.

*Example III*

Light-sensitive silver bromide substantially free from nitrogen-containing binding agents was prepared as follows:

A gelatino-silver bromide emulsion of moderate to high contrast was prepared in the conventional manner. The emulsion was made up to a dilution such as that normally used for the coating of such emulsions, i. e., consisting of about from five to ten per cent gelatin and from three to ten per cent by weight of silver bromide. A 100 gram portion of this emulsion was diluted with 400 cc. of water and treated with 2 cc. of 10% sodium dodecyl sulfate.

The mixture was centrifuged at 120° F. in a centrifuge which effects substantially complete separation of the solids from the liquid portion of the emulsion. After the major portion of liquid had been separated in this way, the solids were washed thoroughly with warm water until free from gelatin. A five-gram portion of this silver bromide was worked into a smooth paste with 5 cc. of ten percent sodium dodecyl sulfate and 20 cc. of water. The resulting dispersion was added to 50 cc. of a ten per cent (by weight) solution of hydrolyzed ethylene-vinyl acetate interpolymer of the type described in Example I in aqueous alcohol containing 20 parts by volume of ethyl alcohol. To the light-sensitive emulsion at 110° F. was added a solution of 0.1 gram of dimethylol urea in ten cc. of water followed by a solution of .5 gram of m-aminophenyl-methyl-pyrazolone. After heating at 90° F. for one half hour, the composition, a condensation product containing units of the probable formula:

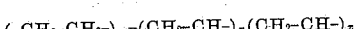
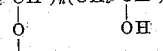
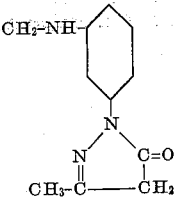

wherein $n$ is about 300, $m$ is about 45 to 50 and $x$ is about 100 was coated on a cellulose nitrate base. When processed by negative color development or by reversal as in Examples I and III, strong magenta images were obtained.

*Example IV*

Solution A:
| | | |
|---|---|---|
| Ammonium bromide | grams | 1188 |
| Potassium iodide | do | 54 |
| Water | cc | 5400 |
| Sodium octadecyl sulfate (10%) | cc | 3.6 |

Solution B:
| | | |
|---|---|---|
| Silver nitrate | grams | 1980 |
| Water | cc | 3600 |
| Ammonium hydroxide (20%) | cc | 2250 |
| Sodium octadecyl sulfate (10%) | cc | 3.6 |

Solution C:
| | | |
|---|---|---|
| The polymer of Example I (10%) | cc | 7200 |
| Water | cc | 7200 |
| Sodium octadecyl sulfate (10%) | cc | 3.6 |

Solution D:
| | | |
|---|---|---|
| Hydrolyzed ethylene/vinyl acetate interpolymer | cc | 7200 |
| Ethyl alcohol | cc | 1800 |
| Potassium bromide | grams | 18 |

Solutions A and B were added to C simultaneously during a two-minute interval, A and B being at 77° F. and C at 112° F. The mixture was stirred slowly for 15 minutes, cooled, and acetone was added with vigorous stirring until coagulation was complete. The liquid was poured off and the remaining solid washed with water by decantation. The solid was shredded further and treated with solution D. After stirring for 15 minutes at 140° F., an emulsion was obtained which can be stored at room temperature indefinitely.

To 400 grams of the above emulsion, which was heated to 110° F., a solution of 4 grams of m-aminophenyl methyl-pyrazolone in 25 cc. of water was added followed by .2 gram of bis-methoxymethyl urea in 10 cc. of alcohol. After heating for ten minutes at 110° F., 5 cc. of two per cent saponin solution were added and the mixture was coated on glossy double weight paper. A hydrophilic layer resulted which contained the same color-yielding units as the product of Example III. After exposing and developing in a p-amino-diethylaniline developing agent, a negative image of excellent strength and color, free from fog, was obtained. The color developer which was used is as follows:

| | | |
|---|---|---|
| p-Aminodiethylaniline hydrochloride | grams | 3 |
| Sodium carbonate (anhydrous) | do | 30 |
| Potassium bromide | do | 1 |
| Water to make | liters | 1 |

The above procedure was repeated using as bonding agents, dimethylol oxamide, N,N'-adipyl bis-(aminomethyl pyridinium chloride), glyoxal, glyoxal-sodium bisulfite, dimethylol urea, and dimethyloladipamide with similar results.

solution of a soluble color-former prepared as follows:

| | | |
|---|---|---|
| N-(p-bromophenyl)-1-naphthol-2-sulfonamide | grams | 4 |
| Alcohol | cc | 50 |
| Sodium hydroxide (20%) | cc | 4 |
| Water | cc | 20 |

To the mixture were then added the following solutions: 8 grams of dimethylol urea in 20 cc. of water; saponin (2%), 10 cc. A condensation product was formed having structural units of the formula:

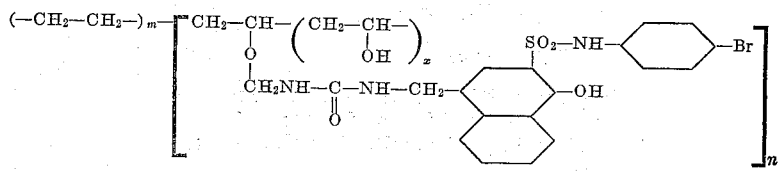

Example V

A polyvinyl alcohol color-forming emulsion was prepared as follows: To 100 cc. of a five per cent solution of polyvinyl alcohol, having a viscosity of 18 to 28 centipoises at 20° C. and an average molecular weight of 20,000 was added 4 grams of centrifuged silver bromide obtained as described in Example III and dispersed in 20 cc. of water. The dispersion was treated at 50° C. for one-half hour with .4 gram of terephthalaldehyde and 2 grams of m-aminophenyl-methyl-pyrazolone whereby a dispersion was obtained in a hydrophilic polyvinyl alcohol color former containing the following structural units.

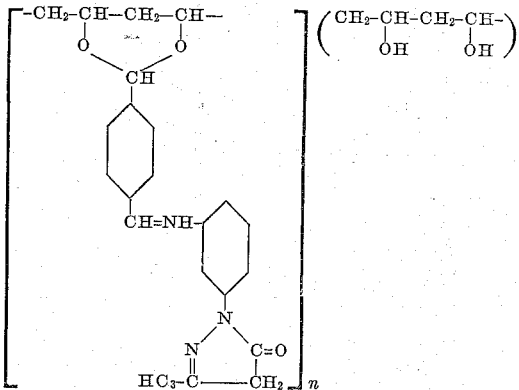

wheren $m$ is about 150 and $n$ is about 100. After cooling somewhat, the emulsion was filtered and coated. Gelling agents may be added if desired. Strong magenta images are obtained as in the previous examples.

Examples VI

A cellulose nitrate film base carrying a thin substratum coating of an ortho-sulfobenzaldehyde acetal of polyvinyl alcohol prepared as described in German Patent 530,337, was coated with a 1 and ½% solution of partially hydrolyzed ethylene/vinyl acetate interpolymer of the type described in Example I. Over this polymer layer was coated a polymer emulsion obtained as follows: To a hydrolyzed ethylene/vinyl acetate interpolymer emulsion obtained as in Example I by precipitation of silver bromide in the polymer solution (800 cc.) was added 400 cc. of water, 100 cc. of a .01% alcoholic solution of naphthoselenocarbocyamine iodide. Then there was added a wherein $m$ is about 45 to 50, $n$ is about 300 and $x$ is about 300. The mixture was held at 110° F. for ten minutes and then coated on the specially subbed base described above. A strong blue green color was obtained when the element was developed in p-aminodiethylaniline.

Example VII

A multilayer film for the production of natural colored photographs of colored subjects was prepared as follows: Over the red sensitive, color-forming blue-green silver halide dispersion which is described in Example VI above, was coated a magenta color-forming silver halide emulsion as described in Example V which has been sensitized for green with erythrosine. Over this layer was coated a filter layer prepared as follows: To 100 cc. of a ten per cent solution of hydrolyzed ethylene/vinyl acetate interpolymer (of the type described in Example I) in 20 per cent alcohol containing .5 gram of silver nitrate were added the following solution: .25 gram diphenyl carbazide in 50 cc. of alcohol; one drop of ammonium hydroxide. The mixture was heated to 92° F. and coagulated by pouring into 500 cc. of acetone. After shredding and washing in 500 cc. of fresh acetone the material was washed for one hour in running water. 80 cc. of water were added and the layer was coated over the green sensitive magenta color-forming silver halide dispersion described above. Alternatively, to the solution of the polymer may be added a yellow dye such as 4-piperonyl butadienyl-alpha pyridinium stearyl bromide. Over the filter layer was coated a non-color-sensitized yellow color-forming polymer silver halide dispersion obtained by the procedure described in Example VI, but using in place of the naphthol derivative, the yellow color-former p-amino-acetoacetanilide. When the completed multi-component film was exposed to a colored subject and processed by reversal as described in Example I, a colored reproduction of the original scene was obtained.

In place of the specific hydrophilic hydroxyl polymers which are described in the above examples, there may be substituted other hydrophilic polymers containing hydroxyl groups. Suitable additional hydroxyl polymers include hydrolyzed olefin/vinyl ester interpolymers described in co-pending application Serial No. 446,116, filed June 6, 1942. These co-polymers may be made from mono-olefins having from 1-5 carbon atoms, e. g., ethylene, propylene, butene-2, etc., other useful polymers are hydrolyzed interpolymers of vinyl acetate, vinyl isobutyrate, with minor proportions of unsaturated compounds such as vinyl chloride, alkylacrylates, alkylmethacrylates, etc. Other suitable polymers include polyvinyl alcohol having molecular weights of 10,000 to 40,000, and ethers, esters and acetals of such polyvinyl alcohols, e. g., methyl and ethyl ethers and the formaldehyde, acetaldehyde, benzaldehyde acetals and the chloride, acetate, chloracetate, etc., esters. Still other suitable hydroxyl polymers include hydrophilic cellulose derivatives including those described in application Serial No. 528,947 filed March 31, 1944, e. g., methyl, hydroxyethyl and ethyl cellulose, cellulose glycolic acid, deacetylated chitin, alginic acids, glycol polyformal, carboxyethyl cellulose, etc.

By hydrophilic polymer or color former is meant a synthetic organic polymeric compound which in the form of thin layers, e. g., 1 to 10 microns in thickness, are insoluble in water at 30° C. but are freely water permeable.

A high water solubility of the original hydroxyl polymers does not prevent its use in the present invention because the introduction of dye intermediate nuclei by condensation usually decreases the cold water solubility to a point where films formed from the hydroxyl polymers are no longer softened excessively in water. However, if the resulting hydrophilic polymeric dye intermediate binding agent still has undesirably high water sensitivity, this can be controlled by the introduction of other groups, such as ester groups, e. g., acetates, propionates, benzoates; ether groups or acetal groups in the presence of the silver salts. Small percentages of aromatic ester or acetal groups may be introduced by treatment with the appropriate aldehyde, acid chloride, etc. in the presence of a suitable acid or basic catalyst. For example, if the final element is too water sensitive, it may be modified by partial acetalization with butyraldehyde. Similarly if the resulting binding agent does not have sufficiently high water sensitivity or permeability, this can be improved by the introduction of solubilization groups, e. g., carboxylic or sulfonic acid groups can be introduced by acetal formation with phthaldehydic acid, ortho-sulfobenzaldehyde, or by esterification with polybasic acids, e. g., phthalic or succinic acid, or with etherification of glycolic acid, or by the use of a dye intermediate with a hydrophilic hydroxyl polymer in the presence of the silver salts.

In addition to the dye intermediate groups of the above examples, other well known color-coupling components which may be employed are phenols, naphthols, or aromatic amines having a coupling position available ortho or para to the aromatic hydroxyl group or amine group, or compounds having an active methylene group, i. e., a compound having a —CH₂— group activated by two unsaturated groups taken from the class of

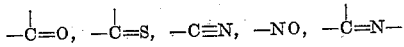

—SO, —CONH—, —COOalkyl, —COOaryl connected either directly or through a conjugated system. Such active methylene compounds are distinguished by their ability to enolize in alkaline solution forming a soluble alkali metal salt and include many acyclic and heterocyclic compounds known in the art. Examples of such active acyclic and intracyclic methylene compounds include (1) beta-keto-acylamides of the type RCOCH₂CONHR, where R is a hydrocarbon or heterocyclic radical and R is preferably aromatic, e. g., benozylacetanilide, p-nitrobenzoylacetanilide, p-nitroacetoacetanilide, naphthoylacetanilide, p-acetoacetaminobenzoic acid, furoylacetanilide, (2) pyrazolones, e. g., 1-phenyl-3-methyl-5-pyrazolone, 1-p-chlorophenyl-3-methyl-5-pyrazolone, 1-phenyl-3-carboxy-5-pyrazolone, 1-(m-sulfophenyl)-3-methyl-5-pyrazolone, (3) indoxyl and thioindoxyl, (4) N-homophthalylamines, e. g., N-homophthalylaniline, N-homophthalyl-n-dodecylamine, N-homophthalyl-beta-naphthylamine, (5) 2,4-dihydroxyquinoline, (6) p-nitrobenzylcyanide, (7) diketohydrindene, (8) malonamides, e. g., ethyl N-phenylmalonamate, N,N'-diphenyl malonamide, (9) phenacylpyridinium bromide, (10) hydroxypyridine, (11) cyanoacetanilide, cyanoacetic ethyl ester.

In the method of preparing these polymeric color-forming light sensitive dispersions employing formaldehyde to connect the color-former to the hydroxyl polymers, the formaldehyde may be in any form. Thus, it can be used as solid paraformaldehyde or dissolved or suspended in water or solvents for the color-former, or as formaldehyde releasing compounds such as trioxane, hexamethylene-tetramine, or compounds capable of forming methylol derivatives, methylenediacetate, methylchloromethyl ether, etc. Alternatively, dimethylol derivatives of amides, ureas, etc., e. g., dimethylolurea, dimethyloladipamide, dimethyloloxamide, dimethylolmelamine and their ethers, such as bismethoxymethylurea, may be used in place of formaldehyde for linking the dye intermediates to the polymer chain. Still other agents which may be employed are trimethylolmelamine, dimethylolpiperazine, tetramethylolethylenediamine, tetrahydro-1,3-dimethylol-5(beta hydroxyethyl)-S-triazone, (2) dimethylol acetone, trimethylolnitromethane, 2-methyl-2-nitro-1,3-propanediol, tetramethyldiphenyldiphenylolpropane, tetramethyloldiphenylolmethane, N,N',N''-tris-(methoxymethyl) melamine, N,N'-bis(methoxymethyl)uron, N,N'-bis(methoxymethyl)piperazine, dioxolan, dichlorodioxane, chlorinated polyalkylene ethers, adipohydroxamic acid and dimercaptomethyl adipamide.

The color-yielding elements of this invention are not limited in their utility to any one process of color photography. They may be used with other color-coupling developing agents than those specifically described in the examples. The arylenediamine compounds such as paraphenylenediamine and its substitution products are preferred. These developers may be substituted in the amino groups as well as in the ring, preferably the former, to constitute compounds such as the mono- and di-alkyl arylenediamines, including the mono- and di-alkyl naphthylenediamines, phenylenediamines and toluylenediamines. The compounds, of course, must have one free primary or unsubstituted amino group which enables the oxidation product of the developer to couple with the color-forming compounds. As examples of developers of the class described, there may be mentioned p-aminodiethylaniline, 1,4-naphthylenediamine, 4-diethylamino-1-naphthylamine. The salts of the bases which may be organic or inorganic are, in general, more soluble and more stable than the free bases. The hydrochlorides and sulfates have great utility in preparing the developing solutions.

This invention has the advantage that rapid drying, non-jelling color-yielding layers in which the color formers do not diffuse can be prepared in a simple and economical manner. The further advantage resides in the fact that simple color formers can be made fast to diffusion in previously prepared colloid silver salt dispersions in a simple and economical manner. A still further advantage resides in the fact that the resulting color-yielding silver salt dispersions have a greater tolerance for organic solvents than gelatin. This permits the use of volatile solvents, together with water which facilitates drying. Thus, the time required for preparing color films, and particularly multi-layer color films, is greatly reduced. The ability to coat rapid drying, non-gelatin layers makes it economically feasible to coat multi-layers in a single coating machine. The layers, for example, may be deposited in rapid succession at adjacent coating positions in the same machine.

Still other advantages will be apparent, to those skilled in the art, from the above description.

Since it is obvious that many changes and modifications can be made in the above-described details without departing from the nature and spirit of the invention, it is to be understood that the invention is not to be limited to the details described herein except as set forth in the appended claims.

What is claimed is:

1. In a process of preparing light-sensitive silver halide emulsions for coating photographic layers, the step which comprises condensing a polyfunctional condensation agent taken from the class consisting of aldehydes and dimethylol derivatives of amides and ureas and ethers of such dimethylol derivatives with a color former having as an active coupling group a structure of the general formula

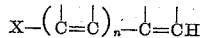

where X is a member taken from the group consisting of hydroxyl and primary and secondary amine radicals and $n$ is a number taken from the group consisting of 0 and 1 and a hydrophilic aliphatic film-forming hydroxyl polymer containing more than 200 carbon atoms and at least one hydroxyl group for each 8 carbon atoms, by causing said three components to interact in a solution of said polymer which has light-sensitive silver halide grains intimately dispersed therethrough.

2. In a process of preparing light-sensitive silver halide emulsions for coating photographic layers, the step which comprises condensing a bifunctional condensation agent taken from the class consisting of aldehydes and dimethylol derivatives of amides and ureas and ethers of such dimethylol derivatives with a low molecular weight color former having as an active coupling group a structure of the general formula

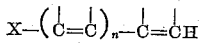

where X is a member taken from the group consisting of hydroxyl and primary and secondary amine radicals and $n$ is a number taken from the group consisting of 0 and 1 and a hydrophilic aliphatic film-forming hydroxyl polymer containing more than 200 carbon atoms and at least one hydroxyl group for each 8 carbon atoms, by causing said three components to interact in a solution of said polymer which has light-sensitive silver halide grains intimately dispersed therethrough.

3. In a process of preparing light-sensitive silver halide emulsions for coating photographic layers, the step which comprises condensing formaldehyde with a color former having as an active coupling group a structure of the general formula

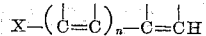

where X is a member taken from the group consisting of hydroxyl and primary and secondary amine radicals and $n$ is a number taken from the group consisting of 0 and 1 and a hydrophilic aliphatic film-forming hydroxyl polymer containing more than 200 carbon atoms and at least one hydroxyl group for each 8 carbon atoms, by causing said three components to interact in a solution of said polymer which has light-sensitive silver halide grains intimately dispersed therethrough.

4. In a process of preparing light-sensitive silver halide emulsions for coating photographic layers, the step which comprises condensing formaldehyde with a color former having as an active coupling group a structure of the general formula

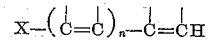

where X is a member taken from the group consisting of hydroxyl and primary and secondary amine radicals and $n$ is a number taken from the group consisting of 0 and 1 and a hydrophilic aliphatic film-forming hydroxyl polymer containing more than 200 carbon atoms and at least one hydroxyl group for each 8 carbon atoms, by causing said three components to interact in a solution of said polymer which has light-sensitive silver halide grains intimately dispersed therethrough, from 1 to 35 mols of formaldehyde being used for each 1 to 35 mols of dye intermediate and each 100 carbon atoms of said polymer.

5. In a process of preparing light-sensitive silver halide emulsions for coating photographic layers, the step which comprises condensing terephthalaldehyde with 1-m-aminophenyl-3-methyl-5-pyrazolone and a hydrophilic hydrolyzed ethylene/vinyl acetate interpolymer containing more than 200 carbon atoms and at least one hydroxyl group for each eight carbon atoms, by causing said three components to interact in a solution of said polymer which has light-sensitive silver halide grains intimately dispersed therethrough and thereby forming a polymeric condensation product containing recurring units of the formula

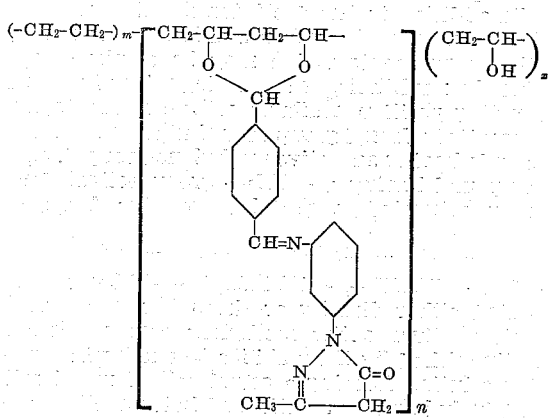

wherein $n$ is about 200, $m$ is about 45 to 50, and $x$ is about 50.

6. In a process of preparing light-sensitive silver halide emulsions for coating photographic layers, the step which comprises condensing dimethylolurea with 1-m-aminophenyl-3-methyl-5-pyrazolone and a hydrophilic hydrolyzed ethylene/vinyl acetate interpolymer containing more than 200 carbon atoms and at least one hydroxyl group for each eight carbon atoms, by causing said three components to interact in a solution of said polymer which has light-sensitive silver halide grains intimately dispersed therethrough and thereby forming a polymeric condensation product containing recurring units of

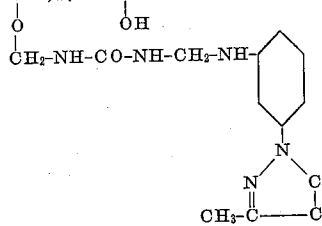

wherein $n$ is about 300, $m$ is about 45 to 50 and $x$ is about 100.

7. In a process of preparing light-sensitive silver halide emulsions for coating photographic layers, the step which comprises condensing dimethylolurea with N - (p - bromophenyl) - 1-naphthol-2-sulfonamide and a hydrophilic hydrolyzed ethylene/vinyl acetate interpolymer containing more than 200 carbon atoms and at least one hydroxyl group for each eight carbon atoms, by causing said three components to interact in a solution of said polymer which has light-sensitive silver halide grains intimately dispersed therethrough and thereby forming a polymeric condensation product containing recurring units of the formula

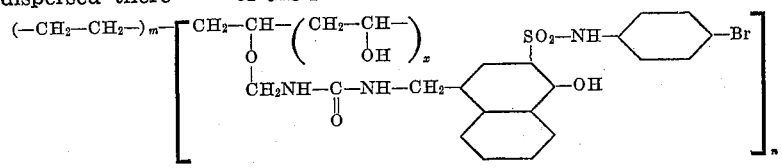

wherein $m$ is about 45 to 50, $n$ is about 300 and $x$ is about 300.

ANDREW B. JENNINGS.

REFERENCES CITED

The following references are of record in the file of this patent:

UNITED STATES PATENTS

| Number | Name | Date |
|---|---|---|
| 2,310,943 | Dorough et al. | Feb. 16, 1943 |
| 2,320,422 | Frohlich | June 1, 1943 |
| 2,279,411 | Peterson | Apr. 14, 1942 |
| 2,367,511 | Lowe et al. | Jan. 16, 1945 |